United States Patent
Gill et al.

(10) Patent No.: US 10,984,140 B2
(45) Date of Patent: *Apr. 20, 2021

(54) METHOD FOR DETECTING THE POSSIBLE TAKING OF SCREENSHOTS

(71) Applicant: Disappears.com Holdings (Canada) Ltd., Vancouver (CA)

(72) Inventors: Jaiten Gill, London (GB); Ivan Makeev, London (GB)

(73) Assignee: DISAPPEARS.COM HOLDINGS (CANADA) LTD.

( * ) Notice: Subject to any disclaimer, the term of this patent is extended or adjusted under 35 U.S.C. 154(b) by 0 days.

This patent is subject to a terminal disclaimer.

(21) Appl. No.: 16/775,809

(22) Filed: Jan. 29, 2020

(65) Prior Publication Data

US 2020/0167508 A1 May 28, 2020

Related U.S. Application Data

(63) Continuation-in-part of application No. 16/229,893, filed on Dec. 21, 2018, now Pat. No. 10,880,735.

(Continued)

(51) Int. Cl.
*G06F 21/84* (2013.01)
*H04W 12/00* (2021.01)
(Continued)

(52) U.S. Cl.
CPC ........... *G06F 21/84* (2013.01); *G06N 3/0454* (2013.01); *G06T 7/70* (2017.01); *H04W 12/002* (2019.01);
(Continued)

(58) Field of Classification Search
CPC ........... H04W 12/00504; G06F 21/601; G06K 9/00971; H04L 51/18
See application file for complete search history.

(56) References Cited

U.S. PATENT DOCUMENTS

| 5,737,419 A | 4/1998 | Ganesan |
| 7,489,803 B2 | 2/2009 | Haynes et al. |

(Continued)

FOREIGN PATENT DOCUMENTS

CA  2897543 A1  3/2016

OTHER PUBLICATIONS

Girshick, R., et al., "Rich feature hierarchies for accurate object detection and semantic segmentation," Open Access version, provided by the Computer Vision Foundation, initially presented at 2014 IEEE Conference on Computer Vision and Pattern Recognition, Sep. 25, 2014, 8 pages; retrieved from: https://www.cv-foundation.org/.../Girshick_Rich_Feature_Hierarchies_2014_CVPR_paper.pdf on May 29, 2019.

(Continued)

*Primary Examiner* — Jeremiah C Hallenbeck-Huber
(74) *Attorney, Agent, or Firm* — Yakov Sidorin; Quarles & Brady LLP (57) ABSTRACT

A method for sending a message from a first device to a second device includes transmitting the message by the first device, receiving the message by the second device, displaying the message on the second device, activating a camera on the second device to capture image data regarding a field of view of the camera, activating one or more light sensors located close to the camera to capture data regarding an amount of ambient light detected by the light sensors, and monitoring the image data to detect a possible presence of one or more suspected camera lenses within the field of view of the camera. Upon the detection of a possible presence of one or more suspected camera lenses within the field of view of the camera or upon detection of a sudden decrease of the amount of ambient light, displaying of the message on the second device is ceased.

16 Claims, 6 Drawing Sheets

Related U.S. Application Data (60) Provisional application No. 62/609,185, filed on Dec. 21, 2017.

(51) Int. Cl.
  *G06T 7/70* (2017.01)
  *G06N 3/04* (2006.01)

(52) U.S. Cl.
  CPC ........... *H04W 12/00504* (2019.01); *G06T 2207/20084* (2013.01); *G06T 2207/30244* (2013.01)

(56) References Cited

U.S. PATENT DOCUMENTS

| | | | |
|---|---|---|---|
| 9,208,753 B2 | 12/2015 | Chan et al. | |
| 9,794,544 B2 | 10/2017 | Chan et al. | |
| 9,898,610 B1* | 2/2018 | Hadsall | G06F 21/32 |
| 2011/0179366 A1* | 7/2011 | Chae | G06F 21/84 |
| | | | 715/764 |
| 2013/0222609 A1* | 8/2013 | Soffer | H04N 5/2252 |
| | | | 348/207.1 |
| 2014/0078164 A1* | 3/2014 | Chan | G06T 7/593 |
| | | | 345/589 |
| 2014/0201844 A1 | 7/2014 | Buck | |
| 2015/0033366 A1* | 1/2015 | Guffrey | H04W 4/21 |
| | | | 726/29 |
| 2018/0330198 A1* | 11/2018 | Harary | G06K 9/6296 |
| 2018/0357984 A1* | 12/2018 | Xia | G06F 21/6245 |

OTHER PUBLICATIONS

International Search Report issued in related International Application No. PCT/CA20108/051651, dated Mar. 18, 2018, 3 pages.

* cited by examiner

METHOD FOR DETECTING THE POSSIBLE TAKING OF SCREENSHOTS

CROSS-REFERENCE TO RELATED APPLICATIONS

This application is a continuation-in-part of U.S. patent application Ser. No. 16/229,893 filed Dec. 21, 2018, which claims the benefit of U.S. Provisional Patent Application No. 62/609,185 filed Dec. 21, 2017. The disclosure of each of the above-identified patent documents is incorporated herein by reference.

FIELD OF THE INVENTION

The present invention relates to computer privacy, and in particular, a method for detecting when a person is possibly attempting to take a screenshot of a mobile device display.

BACKGROUND OF THE INVENTION

In today's age, mobile devices (such as smartphones and tablets) are ubiquitous. Most conventional mobile devices are equipped with at least one camera to allow the user to take photographs or videos. However, the abundance and accessibility of such cameras also allow them to be misused. For example, a person can easily and surreptitiously take a photograph or video of an object without others being aware of this. This is especially concerning when a person attempts to take a photograph or video of the screen of another person's mobile device (e.g. taking a "screenshot") without that person's knowledge or consent. The screen may be displaying confidential or sensitive information that was not intended to be recorded by others.

In another circumstance, mobile devices may be commonly used to send messages between users. There may be times when the sender of a message would not want the message to be captured in a photograph or video (either by the recipient or by others).

There exists, therefore, a need in a method for detecting when another person is attempting to take a screenshot of one's mobile device display.

There also exists a need in a method for alerting the sender of a message that his or her message may be the subject of an attempt by someone to take a screenshot of that message.

SUMMARY OF THE INVENTION

Embodiments of the invention provide a computer-implemented method for sending a message from a first mobile device to a second mobile device. The method include the steps of transmitting the message by the first mobile device, receiving the message by the second mobile device, displaying the message on the second mobile device, and activating a camera located on the second mobile device to capture image data regarding a field of view (for example, representing a scene covered by the field of view) of the camera. The method further includes activating one or more light sensors located in close proximity to the camera in order to capture data representing an amount of ambient light detected by the one or more light sensors, and monitoring the image data to detect a possible presence of one or more suspected camera lenses within the field of view of the camera. Upon detection of such possible presence of the one or more suspected camera lenses within the field of view of the camera and/or upon detection by the one or more light sensors that the amount of ambient light suddenly decreased, the displaying of the message on the second mobile device is ceased.

In a related embodiment, upon detecting of the possible presence of the one or more suspected camera lenses within the field of view of the camera and/or upon detection by the one or more light sensors of a sudden decrease of the amount of ambient light, the second mobile device may additionally or alternatively transmit an alert message to the first mobile device.

In a related embodiment, the second mobile device includes a display interface for displaying the message on the second mobile device.

In still another related embodiment, the camera and the one or more light sensors are appropriately located on a same side of the second mobile device as that on which the display interface is located.

In a further embodiment, the monitoring of the image data to detect the possible presence of the one or more suspected camera lenses within the field of view of the camera includes converting the image data into a plurality of input images (here, each of the input images depicts the field of view of the camera at a particular point in time); generating a probability map for each of the input images (such probability map is configured to depict or represent a probability that the one or more suspected camera lenses are present at particular spatial locations on each of the input images); and generating a decision (for example, in a form of a user-perceivable output such as an image, an audible signal, a record on a chosen tangible storage medium, to name just a few) as to the possible presence of the one or more suspected camera lenses within the field of view of the camera based, at least in part, on the probability map.

In still a further embodiment, the probability that the one or more suspected camera lenses are present at particular spatial locations on each of the input images is determined, at least in part, by comparison of the particular spatial locations on each of the input images with a plurality of conventional camera lens images.

In another embodiment, the comparison of the particular spatial locations on each of the input images with a plurality of conventional camera lens images uses, at least in part, convolutional neural networks.

In yet another embodiment, the message contains an activation flag, the activation flag being processed by the second mobile device to determine whether to carry out the step of monitoring the image data to detect a possible presence of one or more suspected camera lenses within the field of view of the camera.

In still yet another embodiment, the alert message is displayed by the first mobile device.

In a further embodiment, one or more motion sensors located on the second mobile device are activated to capture data representing movement of the second mobile device, and the ceasing of the display of the message on the second mobile device is also triggered upon the detection by the one or more motion sensors of a sudden movement of the second mobile device.

In another embodiment, a system for sending a message from a first mobile device to a second mobile device contains a mobile application instanced on each of the first and second mobile devices, and a server in network communications with each of the first and second mobile devices for facilitating sending and receiving of the message. Here, each of the first and second mobile devices includes a corresponding programmable computer processor and an associated tangible non-transitory storage medium, and the storage media of the first and second mobile devices contains program codes which, when loaded on a corresponding mobile device, implements respectively first and second mobile applications.

The first mobile application on the first mobile device is configured to send the message to the second mobile device. The second mobile application on the second mobile device is configured to receive the message from the first mobile device, to display the message on the second mobile device, to activate a camera located on the second mobile device in order to capture image data regarding a field of view (for example, representing a scene covered by the field of view) of the camera, to activate one or more light sensors located in close proximity to the camera in order to capture data regarding an amount of ambient light detected by the one or more light sensors, and to monitor the image data to detect a possible presence of one or more suspected camera lenses within the field of view of the camera. Upon detection of the possible presence of the one or more suspected camera lenses within the field of view of the camera or upon detection by the one or more light sensors of a sudden decrease in the amount of ambient light, the display of the message on the second mobile device is ceased.

In still another embodiment, the second mobile application on the second mobile device is further configured to transmit an alert message from the second mobile device to the first mobile device upon detection of the possible presence of the one or more suspected camera lenses within the field of view of the camera or upon detection by the one or more light sensors of a sudden decrease in the amount of ambient light.

In yet another embodiment, the second mobile application on the second mobile device is further configured to convert the image data into a plurality of input images, wherein each of the input images depicts the field of view of the camera at a particular point in time, to generate a probability map for each of the input images depicting a probability that the one or more suspected camera lenses are present at particular spatial locations on each of the input images, and to generate a decision (for example, with the use of a computer processor and in a form of a user-perceivable output such as an image, an audible signal, a record on a chosen tangible storage medium, to name just a few) as to the possible presence of the one or more suspected camera lenses within the field of view of the camera based, at least in part, on the probability map.

Alternatively or in addition, and in yet another related embodiment, the second mobile application on the second mobile device is further configured to activate one or more motion sensors located on the second mobile device in order to capture data regarding movement of the second mobile device. The ceasing of the display of the message on the second mobile device is also triggered upon detection by the one or more motion sensors of a sudden movement of the second mobile device.

The foregoing was intended as a summary only and of only some of the aspects of the invention. It was not intended to define the limits or requirements of the invention. Other features of the invention will be appreciated by a skilled artisan from the detailed description provided below.

BRIEF DESCRIPTION OF THE DRAWINGS

The invention will be described by reference to the detailed description of the embodiments and to the drawings thereof, in which.

Generally, to facilitate clarity of presentation, not all elements present in one Drawing may necessarily be shown in another.

DETAILED DESCRIPTION OF THE INVENTION

The present invention may be implemented in numerous ways, including as a process, an apparatus, a system, or a computer program embodied on a computer-readable storage medium. Furthermore, the present invention may also be implemented using a processor, such as through a process configured to execute instructions stored on and/or provided by a memory coupled to the processor.

Figure 1:
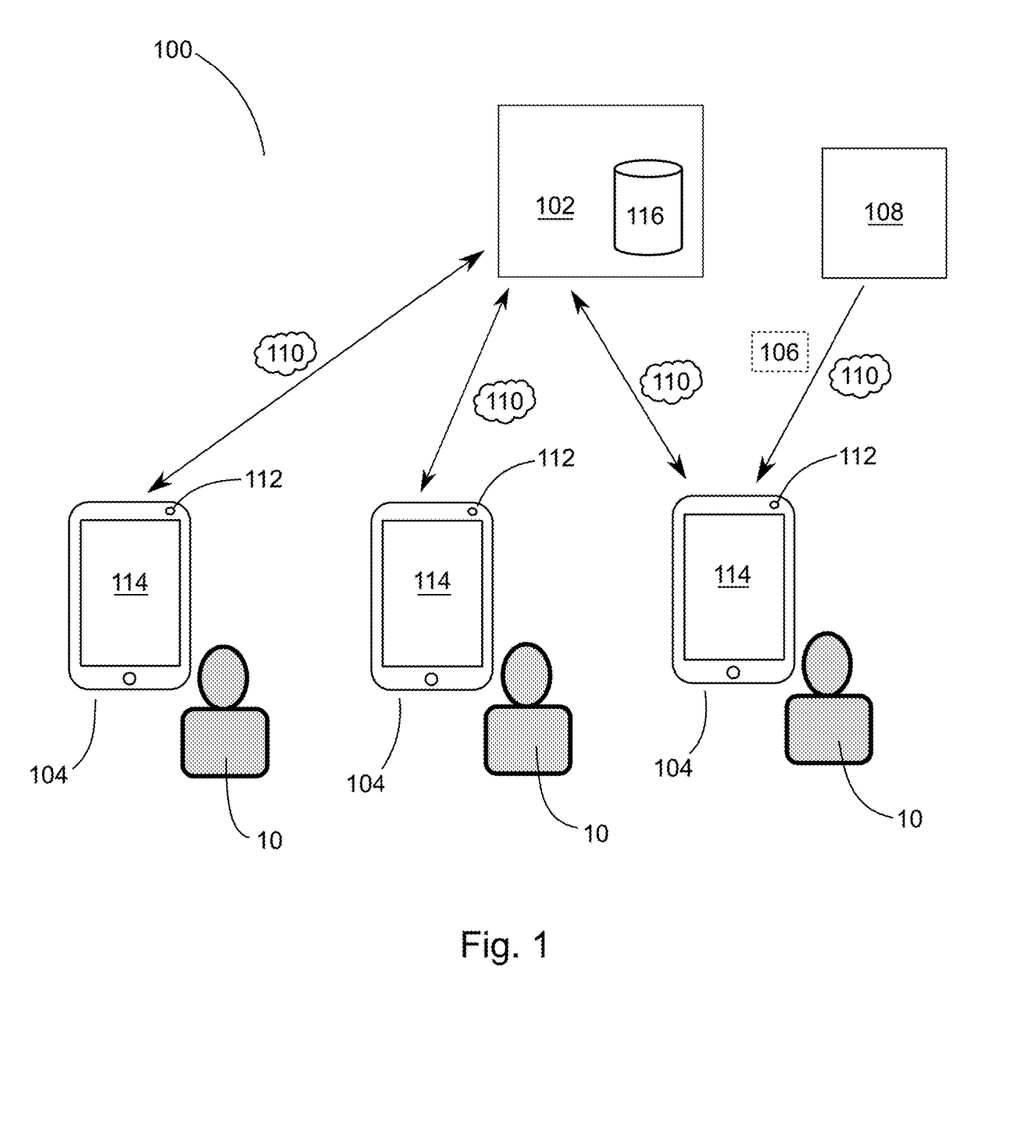
FIG. 1 is a schematic of a system configured in accordance with an embodiment of the invention.
Figure 2:
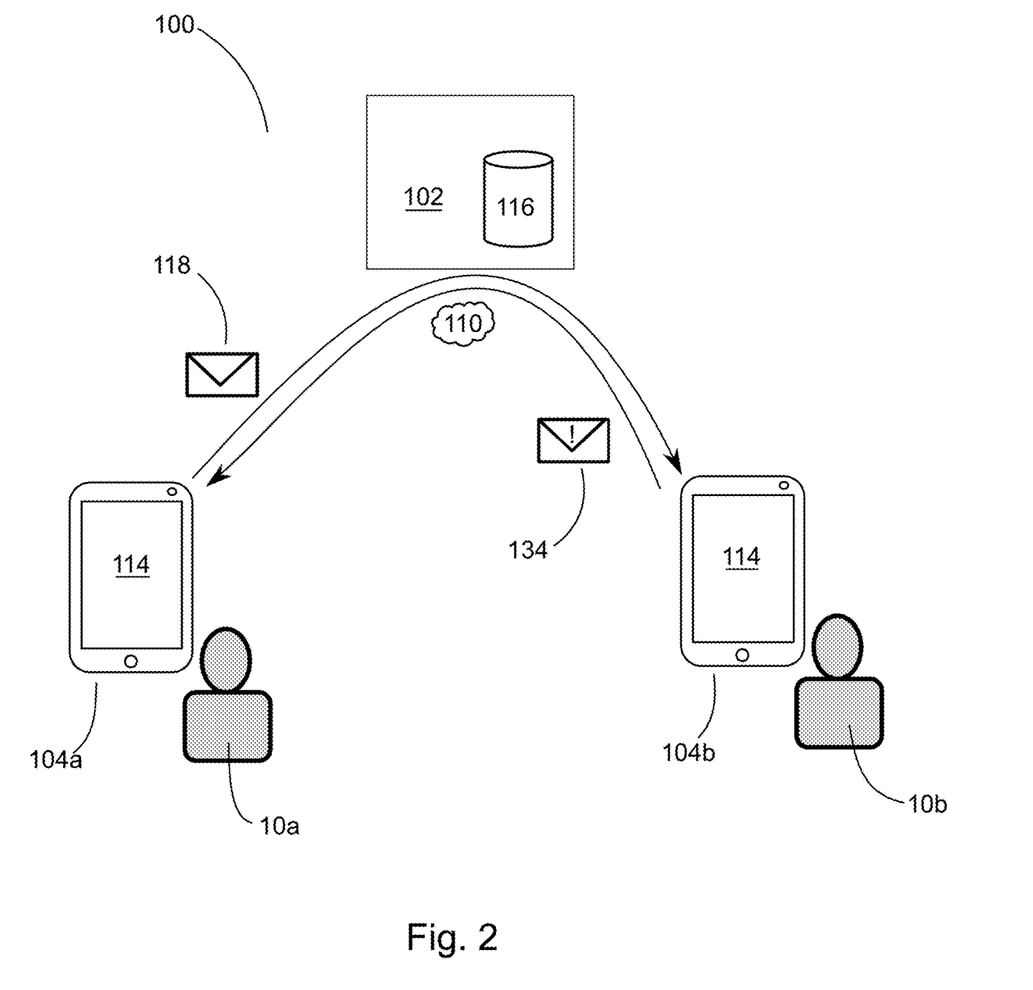
FIG. 2 depicts the operation of the embodiment of the system when a first user sends a message to a second user.

Referring to FIGS. 1 and 2, a system 100 in accordance with an embodiment of the invention includes a server 102 and a plurality of mobile devices 104. The mobile devices 104 may include devices such as smartphones, tablets, or the like. In one embodiment, the mobile devices 104 may make use of the present invention via a mobile application 106 obtained from a software distribution service 108 (e.g. an app store, such as those provided by Apple, Google, Microsoft, Blackberry, etc.). The mobile devices 104 are able to transmit and receive data across a network 110. The network 110 may include wired, wireless, cellular, or satellite networks. In addition, the network 110 may be a closed network (e.g. a private network) or an open network (e.g. the Internet).

Each of the mobile devices 104 (e.g. 104*a*, 104*b*, 104*c*, etc.) is associated with a user 10 (e.g. 10*a*, 10*b*, 10*c*, etc.).

Each of the mobile devices 104 includes a camera 112 configured to capture photographs and/or videos. Each of the mobile devices 104 also preferably contains a display interface 114 that is able to display information to the users 10 (e.g. a screen or display). In addition, the display interface 114 is preferably configured to also be able to accept input from the users 10 (e.g. in the form of touch input for touchscreens). Preferably, the camera 112 is located on the same side of the mobile device 104 as the display interface 114 (typically referred to as being "forward-facing").

The mobile application 106 allows the users 10 to exchange messages amongst each other. In order to do so, each of the users 10 may first obtain a copy of the mobile application 106 suitable for their respective mobile devices 104. They may do so by accessing the appropriate software distribution service 108 for their mobile devices 104. For example, if user 10a wishes to exchange messages with user 10b, both users 10a, 10b must obtain a copy of the mobile application 106 suitable for their respective mobile devices 104a, 104b. If, for example, the mobile device 104a operates on the iOS operating system, then the appropriate software distribution service 108 for the mobile device 104a may be the Apple App Store. Similarly, if the mobile device 104b operates on the Android operating system, then the appropriate software distribution service 108 for the mobile device 104b may be the Google Play Store. It is understood that other versions of the mobile application 106 may also be used.

Once both users 10a, 10b have obtained (e.g. downloaded) the mobile application 106 appropriate for their respective mobile devices 104a, 104b, the mobile application 106 may be installed on the respective mobile devices 104a, 104b. At this time, depending on the operating systems for the mobile devices 104a, 104b, the users 10a, 10b may be required to grant permission for the mobile application 106 to provide commands to and to receive data from the camera 112.

In one embodiment, once the mobile application 106 has been installed on the respective devices 104a, 104b, the users 10a, 10b must first register with the server 102 before they are able to use the system 100. The registration process may require that each of the users 10a, 10b create appropriate usernames and/or passwords to allow access to the system 100. The server 102 may contain a user database 116 for storing data regarding the users 10.

Referring to FIG. 2, suppose that the user 10a wishes to send a message to the user 10b. In addition, the user 10a may wish to ensure that the contents of the message are not the subject of a screenshot or video (taken either by a third party or by even the user 10b himself or herself) when displayed on the mobile device 104b of the user 10b.

Figure 4:
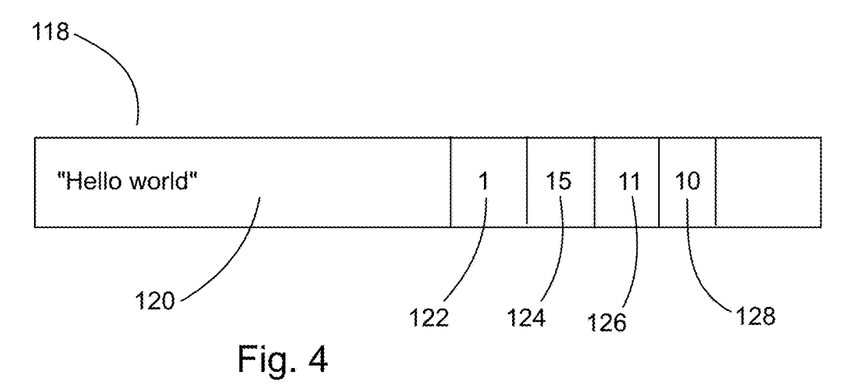
FIG. 4 shows a format for a secure message in accordance with an embodiment of the invention.

In order to do so, the system 100 uses a secure message 118 for the transmission of messages. The format for the secure message 118 may contain a number of fields, including message contents 120. FIG. 4 shows a possible format for the secure message 118. The message contents 120 may include data such as text, photographs, videos, or combinations of the foregoing.

The user 10a first composes the message contents 120 on the mobile device 104a using the mobile application 106. The message contents 120 may be composed through the display interface 114 of the mobile device 104a, such as by using touch input on the display interface 114. Other methods for composing the message contents 120 are also possible, such as through voice input or by video capture.

Once the user 10a has finished composing the message contents 120 on the mobile device 104a, the user 10a is able to indicate whether screenshot detection is to be activated for the message contents 120. The format for the secure message 118 further has a field for an activation flag 122. The user 10a may choose to activate screenshot detection for the message contents 120 by setting the activation flag 122 in the secure message 118. In one embodiment, the user 10a may set the activation flag 122 through the display interface 114 (e.g. by selecting an appropriate input on the display interface 114). In addition, the format for the secure message 118 may also have a field for a message id 124, which uniquely identifies the particular secure message 118. The format for the secure message 118 may also have additional fields, such as a sender id 126 for identifying the sender, and/or a recipient id 128 for identifying the recipient.

The user 10a can then transmit the secure message 118 (e.g. by selecting an appropriate input on the display interface 114) through the network 110. In one embodiment, the mobile application 106 on the mobile device 104a transmits the secure message 118 to the server 102 through the network 110. The server 102 processes the secure message 118 and relays the secure message 118 through the network 110 to the appropriate recipient (i.e. the mobile device 104b) by using the recipient id 128. In another embodiment, the mobile application 106 on the mobile device 104a transmits the secure message 118 directly to the mobile device 104b through the network 110.

Figure 3:
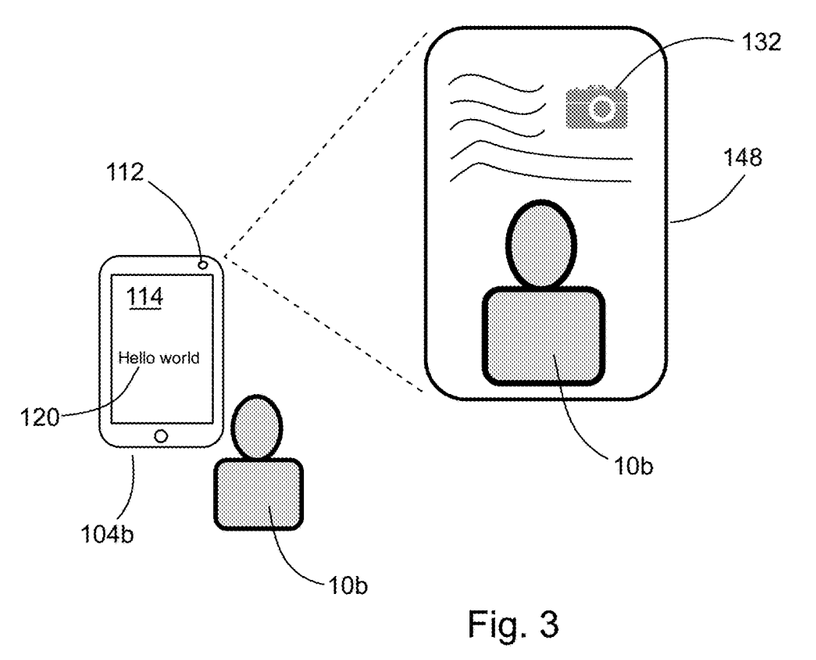
FIG. 3 illustrates the capture of camera data in accordance with an embodiment of the invention.

Referring to FIG. 3, once the secure message 118 is received by the mobile device 104b, the mobile application 106 on the mobile device 104b processes the secure message 118. The mobile application 106 checks to see if the activation flag 122 for screenshot detection is set. If the activation flag 122 is set, the mobile application 106 will activate the camera 112 on the mobile device 104b. The camera 112 will then start capturing camera data 130. The camera data 130 may be in the form of a successive series of photographs or a stream of data (e.g. a video stream).

At the same (or approximately the same) time, the message contents 120 is displayed on the display interface 114 of the mobile device 104b. If the activation flag 122 is not set (i.e. the user 10a did not want screenshot detection activated for the message contents 120), then the message contents 120 are simply displayed on the display interface 114 of the mobile device 104b.

If the activation flag 122 is set, the camera data 130 is processed by the mobile application 106 to assess the likelihood (i.e. probability) that one or more suspected camera lenses 132 are within the field of view of the camera 112 (as described below in more detail) at a particular point in time. This probability provides an indication of whether a person (either a third party or the user 10b) may be trying to take a screenshot or video of the display interface 114 of the mobile device 104b by using another image capturing device (e.g. another camera).

The camera data 130 is continually processed by the mobile application 106 as it is captured by the camera 112. Preferably, this continues until the message contents 120 are no longer displayed on the display interface 114 of the mobile device 104b (e.g. if the user 10b closes the mobile application 106).

If at any time while the message contents 120 are still displayed on the display interface 114 of the mobile device 104b the mobile application 106 detects a likelihood that one or more suspected camera lenses 132 is within the field of view of the camera 112, the mobile application 106 will generate an alert message 134. The likely presence of one or more suspected camera lenses 132 within the field of view of the camera 112 is one possible indication that someone may be attempting to take a screenshot or video of the display interface 114 of the mobile device 104b.

Figure 5:
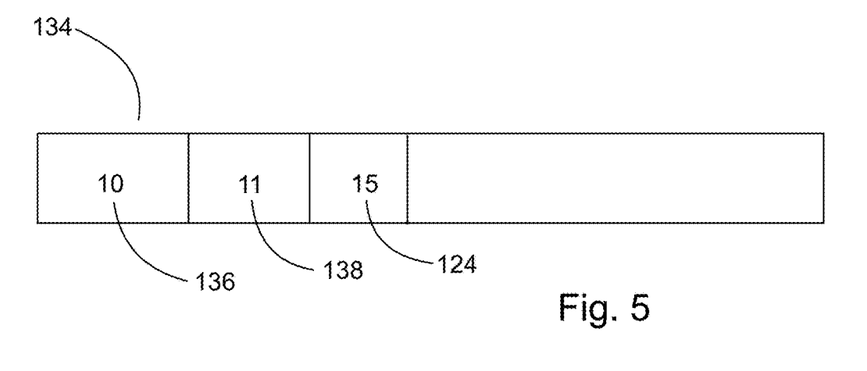
FIG. 5 shows an example of format for an alert message in accordance with an embodiment of the invention.

FIG. 5 shows a possible format for the alert message 134. The format of the alert message 134 accommodates a number of fields, including an alert sender id 136 for identifying the sender of the alert message 134, and/or an alert recipient id 138 for identifying the recipient of the alert message 134. The format of the alert message 134 may also include the message id 124. In addition, the format of the alert message 134 may include additional fields, such as information regarding the time and/or date at which the likely presence of one or more suspected camera lenses 132 was detected.

The mobile application 106 will cease to display the message contents 120 on the display interface 114 of the mobile device 104b. In addition, the mobile application 106 will transmit the alert message 134 to the mobile device 104a through the network 110. In one embodiment, the alert message 134 will be transmitted by the mobile application 106 of the mobile device 104b to the server 102 through the network 110. The server 102 processes the alert message 134 and relays the alert message 134 through the network 110 to the appropriate recipient (i.e. the mobile device 104a) by using the alert recipient id 138. In another embodiment, the alert message 134 will be transmitted by the mobile application 106 of the mobile device 104b directly to the mobile device 104a through the network 110.

When the alert message 134 is received by the mobile device 104a, the mobile application 106 on the mobile device 104a will process the alert message 134 and display an appropriate warning on the display interface 114 of the mobile device 104a to alert the user 10a that there was a likelihood that someone was attempting to take a screenshot or video of the message contents 120. In addition, if the format of the alert message 134 includes fields containing further information about the detection of the likely attempt to take a screenshot or video of the message contents 120 (e.g. the time and/or date of the detection), that information may also be displayed on the display interface 114 of the mobile device 104a.

In a similar manner, the user 10b, using the mobile device 104b, can send a message to the user 10a, using the mobile device 104a.

Figure 6:
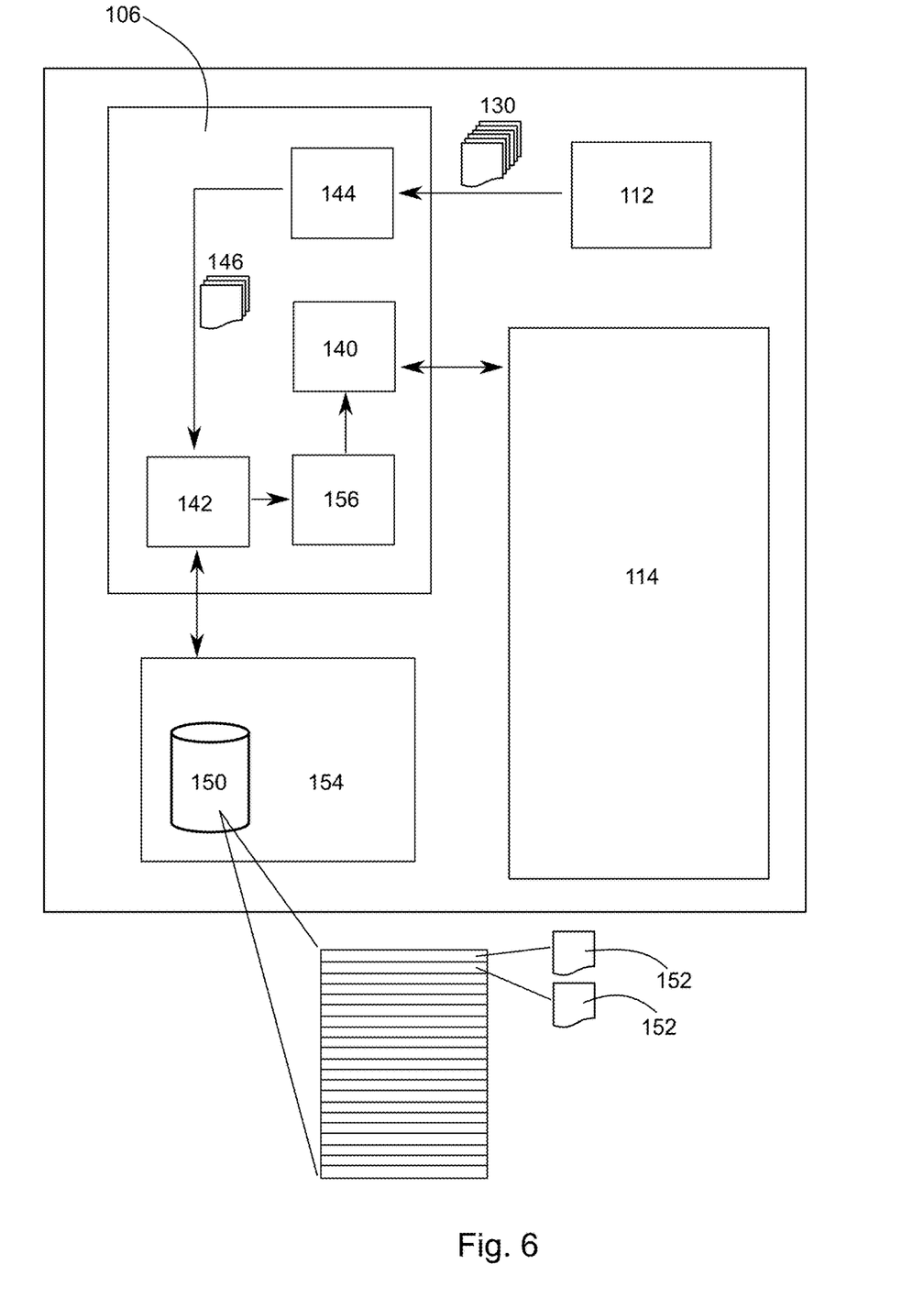
FIG. 6 is a block diagram showing an example of the operation of an embodiment of the invention.

Referring to FIG. 6, the process by which the mobile application 106 detects if a person may be trying to take a screenshot or video of the display interface 114 (and thus possibly attempting to take a screenshot or video of the message contents 120) is structured as follows.

When the mobile application 106 receives the secure message 118 through the network 110, a message processing module 140 of the mobile application 106 processes the secure message 118 and determines whether the activation flag 122 is set for the secure message 118. If the activation flag 122 is set (i.e. the sender of the secure message 118 wishes that screenshot detection be enabled for the message contents 120), then the message processing module 140 will activate a lens detection module 142 of the mobile application 106.

The lens detection module 142 assesses the likelihood that one or more suspected camera lenses 132 is present within the field of view of the camera 112, based on data from the camera 112. The message processing module 140 will also cause the message contents 120 to be displayed on the display interface 114.

Once the lens detection module 142 has been activated, the lens detection module 142 will activate a camera input module 144 of the mobile application 106. The camera input module 144 causes the camera 112 to start capturing the camera data 130, which is received by the camera input module 144. Preferably, the camera input module 144 will cause the camera data 130 to be continually generated by the camera 112, at least while the message contents 120 is displayed on the display interface 114. The camera input module 144 takes the camera data 130 and provides input data 146 to the lens detection module 142 for processing.

Preferably, when the message contents 120 is no longer displayed on the display interface 114 (e.g. if the user 10 switches away from the mobile application 106 or if the display interface 114 is displaying another message), the message processing module 140 will cause the camera input module 144 to stop capturing the camera data 130.

The camera data 130 may include a series of photographic images taken by the camera 112 at various time intervals. In this case, some or all of the photographic images may be provided as the input data 146 to the lens detection module 142 for processing. In the event that the time interval between the successive capturing of the photographic images is relatively short, not all of the photographic images may be provided as the input data 146 in order to reduce the amount of data required to be processed by the lens detection module 142.

Alternatively, the camera data 130 may include a video stream. If the camera data 130 includes a video stream, the camera input module 144 may isolate individual video frames of the video stream and send the video frames as the input data 146 to the lens detection module 142 for further processing. The video frames may be taken at various time intervals of the video stream (as opposed to providing all of the video frames in the video stream) in order to reduce the amount of data required to be processed by the lens detection module 142.

As a result, the input data 146 provided to the lens detection module 142 preferably includes input images 148, which may contain a selection of photographic images or video frames of the camera data 130. Each of the input images 148 depicts the field of view of the camera 112 at a particular point in time when the message contents 120 is being displayed on the display interface 114 of the mobile device 104. For example, FIG. 3 depicts one possible input image 148 at a particular point in time. As shown in FIG. 3, since the camera 112 is preferably forward-facing, it is likely that the user 10b will appear in the input image 148, especially if the user 10b is looking at the message contents 120 on the display interface 114 at that time.

The lens detection module 142 may employ convolutional neural network (CNN) and image recognition techniques to process the input images 148 to determine the likelihood that one or more suspected camera lenses 132 is present in the input images 148. In doing so, the lens detection module 142 may utilize a lens database 150 including conventional camera lens images 152 for various conventional cameras and mobile phones on the market. For example, the lens database 150 may initially include more than 1000 conventional camera lens images 152. The actual number of conventional camera lens images 152 may vary. The lens database 150 may be stored in memory 154 of the mobile device 104 or it may be stored remotely. If the lens database 150 is stored remotely, the lens detection module 142 may be able to access the lens database 150 through communications through the network 110 (e.g. through the Internet).

The lens detection module 142 may perform analysis on one or more of the input images 148 and generates a two-dimensional probability map that predicts the probability that one or more suspected camera lenses 132 are present at certain spatial locations on the particular input image 148. For example, the lens detection module 142 may assess various spatial locations on the input image 148 to determine whether the portion of the input image 148 at those spatial locations correspond to any of the conventional camera lens images 152.

The lens detection module 142 uses the probability map to generate a global binary decision on whether the alert message 134 should be generated. By way of example only, the lens detection module 142 may be configured to generate the alert message 134 if the probability map indicates that there is a greater than 50% probability that one or more suspected camera lenses 132 are present at any location on input image 148. It is understood that the lens detection module 142 may also be configured to generate the alert message 134 using different thresholds or criteria. Therefore, the alert message 134 is generated based, at least in part, on a probability that one or more suspected camera lenses 132 are present on one or more of the input images 148.

The possible presence of one or more suspected camera lenses 132 in the input image 148 is an indication that someone may be trying to use another camera (e.g. from another mobile device) to try to take a screenshot or video of the display interface 114 (and thus the message contents 120). It may be possible that the presence of the one or more suspected camera lenses 132 is entirely innocent (i.e. there is no intention of taking a screenshot or video); however, the alert message 134 may still be generated out of an abundance of caution in order to prevent any possible taking of a screenshot or video. In other embodiments, if the lens detection module 142 may also take into account other data, including the approximate distance between the camera 112 and the one or more suspected camera lenses 132, the orientation of the one or more suspected camera lenses 132 with respect to the camera 112, the model of the one or more suspected camera lenses 132, etc. This information may also be used in generating the decision on whether the alert message 134 should be generated.

For example, in the example of the input image 148 shown in FIG. 3, the likely presence of suspected camera lens 132 in the input image 148 may result in the lens detection module 142 generate the alert message 134.

By using CNN techniques, the lens detection module 142 may identify as suspected camera lenses 132 not only those corresponding to the conventional camera lens images 152 already in the lens database 150, but the lens detection module 142 may also identify as suspected camera lenses 132 any objects that generally resemble those depicted in the conventional camera lens images 152. In this manner, even if the input image 148 contains an image of a camera lens that is not currently part of the lens database 150 of conventional camera lens images 152, the lens detection module 142 may still be able to identify it as being one suspected camera lens 132 and the alert message 134 may still be accordingly generated. In this manner, even if someone attempts to take a screenshot or video using a device that does not match those currently depicted in the lens database 150 of conventional camera lens images 152, the lens detection module 142 may still be able to identify it as being one suspected camera lens 132.

In one embodiment, if the image of the suspected camera lens 132 is not already part of the lens database 150 of conventional camera lens images 152, the image of the suspected camera lens 132 is added to the lens database 150.

In the event that the alert message 134 has been generated by the lens detection module 142, the alert message 134 will be processed by the alert processing module 156. The alert processing module 156 will cause the message processing module 140 to stop displaying the message contents 120 on the display interface 114. The message processing module 140 may also display a suitable message on the display interface 114 to advise the user 10 as to why the message contents 120 are no longer being displayed.

The alert processing module 156 will also cause the alert message 134 to be sent from the mobile device 104 to the sender (e.g. user 10a) of the secure message 118. The alert message 134 may include information such as the alert sender id 136, the alert recipient id 138, and the message id 124. In addition, the alert message 134 may also include information such as the time and/or date at which the likely presence of one or more suspected camera lens 132 was detected. The alert message 134 may further include the input image 148 that depicts the possible presence of the suspected camera lens 132.

The alert message 134 may be configured to be received by the mobile application 106 on the mobile device 104 of the sender (e.g. user 10a) through the network 110. Alternatively, the alert message 134 may be in the form of a text message or email sent to user 10a.

When the sender of the secure message 118 receives the alert message 134 through his or her mobile device 104 (e.g. mobile device 104a), the mobile application 106 on the mobile device 104a will process the alert message 134. The message processing module 140 will alert the user 10a (such as through the display interface 114) that the message contents 120 of the secure message 118 was possibly the subject of a screenshot or video. By using the message id 124, the message processing module 140 is also able to identify to the user 10a which of messages sent by the user 10a was the secure message 118 that was the subject of a possible screenshot or video. In addition, other information that may be included in the alert message 134 (e.g. the time and/or date at which the likely presence of one or more suspected camera lens 132 was detected, the input image 148 that depicts the possible presence of the suspected camera lens 132, etc.) may be displayed to the user 10a.

Figure 7:
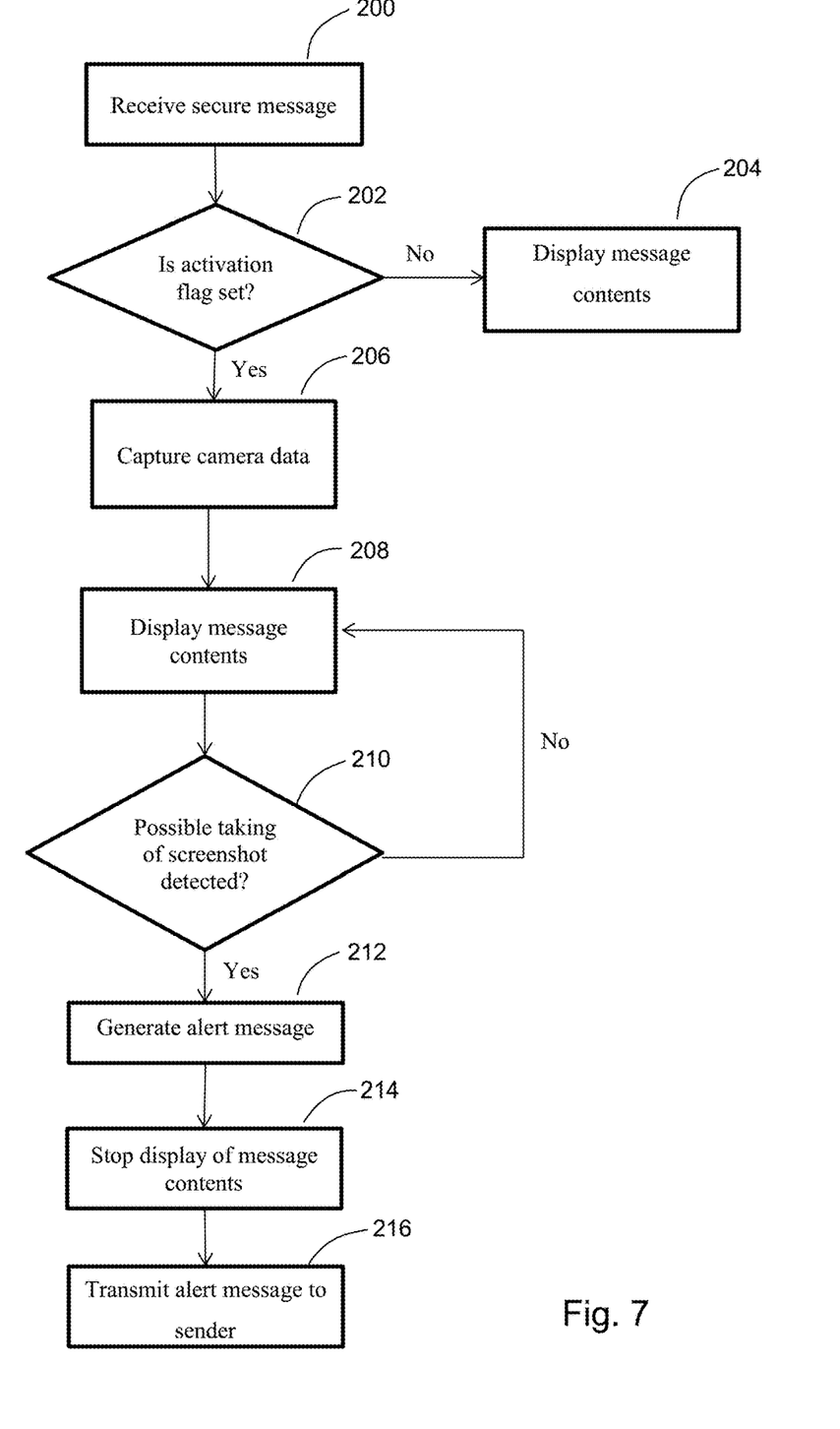
FIG. 7 is a flowchart showing the processing of the secure message in accordance with an embodiment of the invention.

Referring to FIG. 7, a flow chart for the process of detecting the possible presence of a suspected camera lens is depicted. When the secure message 118 is received through the network 110 (step 200), the secure message 118 is processed to determine whether the activation flag 122 is set (step 202). If the activation flag 122 is not set, then the message contents 120 are displayed on the display interface 114 (step 204). If the activation flag 122 is set, the camera 112 is configured to begin capturing camera data 130 (step 206). The message contents 120 are also displayed on the display interface 114 (step 208). The camera data 130 is analyzed to determine whether a suspected camera lens 132 is possibly or likely present in the field of view of the camera 112 (step 210). If no suspected camera lens 132 is possibly or likely present, the message contents 120 continue to be displayed on the display interface 114 (step 208). If, however, there is one or more suspected camera lenses 132 in the field of view of the camera 112, the alert message 134 is generated (step 212). The message contents 120 cease to be displayed on the display interface 114 (step 214), and the alert message 134 is transmitted to the sender of the secure message 118 (step 216).

Figure 8:
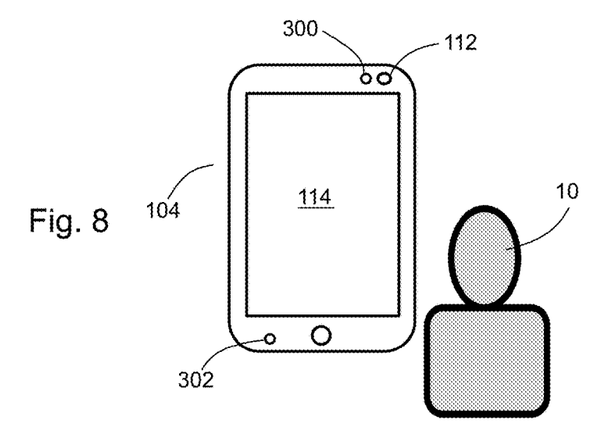
FIG. 8 depicts another embodiment of the mobile device.
Figure 9:
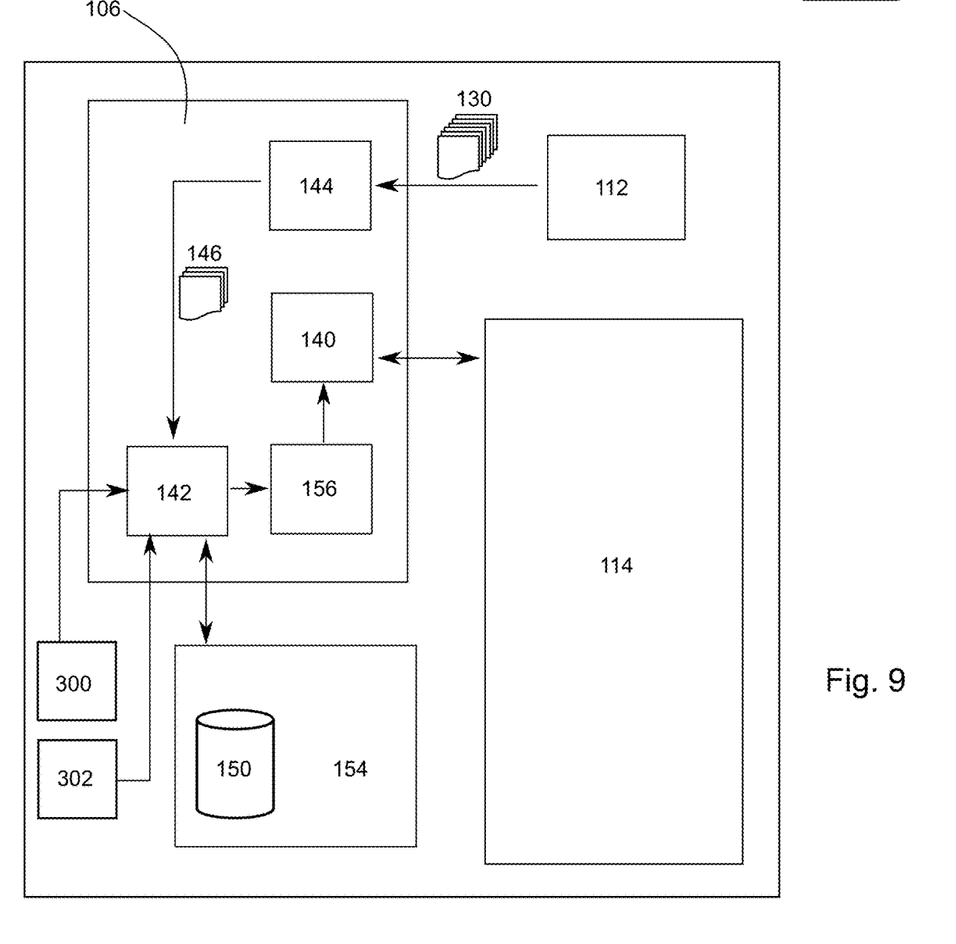
FIG. 9 is a block diagram showing the components of the invention in accordance with the embodiment of FIG. 8.

Referring to FIGS. 8 and 9, in another embodiment, the mobile device 104 may further include one or more light sensors 300 that are configured to detect an amount of ambient light reaching the light sensors 300. The light sensors 300 may preferably be located on the mobile device 104 such that they are in close proximity to the location of the camera 112. (The term close proximity is defined to represent a separation distance within a range of distances defined by a geometrical extent of the mobile device, and depending on the particular implementation—the distance between 0.5 cm and 5 cm, preferably between 0.5 cm and 3 cm from the location of the camera 112.) The light sensors 300 attempt to prevent the user 10 from trying to circumvent screenshot detection by physically covering the camera 112. For example, if the user 10 covers the camera 112, then the lens detection module 142 would not be able to detect the presence of any suspected camera lenses 132 within the field of view of the camera 112. However, because the light sensors 300 are preferably located in close proximity to the location of the camera 112, any attempt to cover the camera 112 will likely result in the light sensors 200 being covered as well. If the light sensors 300 detect that the amount of light detected is abnormally low (e.g. compared to the amount of light detected by the light sensors 300 within a previous predetermined amount of time) or if there has been a sudden decrease in the amount of light detected, the light sensors 300 may cause the lens detection module 142 to generate the alert message 134 (e.g. similar to as if there was the likely presence of suspected camera lens 132 in the input image 148). The alert message 134 can then be processed by the alert processing module 156.

In this embodiment, once the light sensors 300 detect that a normal level of ambient light is now present, then the mobile application 106 may resume normal operation.

In another embodiment, instead of having the light sensors 300 present on the mobile device 104, the camera 112 may also be configured to detect the amount of ambient light present. In this embodiment, the camera data 130 generated by the camera 112 may include information regarding the amount of ambient light detected by the camera 112. Based on this information, the camera input module 144 may cause the alert message 134 to be generated. In particular, if the camera data 130 indicates that the amount of light detected by the camera 112 is abnormally low (e.g. compared to the amount of light detected by the camera 112 within a previous predetermined amount of time) or that there has been a sudden decrease in the amount of light detected (such as if the user 10 had physically covered up the camera 112), then the alert message 134 may be generated. The alert message 134 can then be processed by the alert processing module 156.

In this embodiment, once the camera data 130 indicates that a normal level of ambient light is now present, then the mobile application 106 may resume normal operation.

Referring again to FIGS. 8 and 9, the mobile device 104 may also further includes one more motion sensors 302 that are configured to detect movement of the mobile device 104. Normally, when the user 10 is viewing the display interface 114 (e.g. reading the message contents 120), there should be little movement of the mobile device 104. The motion sensors 302 attempt to prevent the user 10 from trying to circumvent screenshot detection by moving the mobile device 104 around (thus interfering with the operation of the camera 112 and the lens detection module 142). In this embodiment, if the motion sensors 302 detect movement of the mobile device 104 (or alternatively, a high degree of movement of the mobile device 104), the motion sensors 302 may cause the lens detection module 142 to generate the alert message 134 (e.g. similar to as if there was the likely presence of suspected camera lens 132 in the input image 148). The alert message 134 can then be processed by the alert processing module 156.

Once the motion sensors 302 detect that the movement has stopped, then the mobile application 106 may resume normal operation.

Although the techniques described herein have been in association with mobile devices 104, it is understood that similar techniques may be used in association with fixed computers (e.g. personal computers). By way of example, personal computers that are equipped with cameras and displays may be able to use the techniques described herein to exchange secure messages.

It will be appreciated by those skilled in the art that the preferred embodiments have been described in some detail but that certain modifications may be practiced without departing from the principles of the invention.

The invention claimed is:

1. A computer-implemented method for sending a message from a first user with a first mobile device to a second user with a second mobile device, the method comprising the steps of:

with the use of a mobile application present on the first mobile device and said mobile application present on the second mobile device:

transmitting the message by the first mobile device;

receiving the message by the second mobile device having a camera;

displaying the message on the second mobile device for viewing by the second user;

activating the camera located on the second mobile device in order to capture image data regarding a field of view of the camera;

activating one or more light sensors located in close proximity to the camera in order to capture light data representing whether the camera is physically obstructed based on an amount of ambient light detected by the one or more light sensors;

monitoring the image data to detect a possible presence of one or more suspected camera lenses within the field of view of the camera;

upon a first detection of the possible presence of the one or more suspected camera lenses within the field of view of the camera, or upon a second detection by the one or more light sensors of a decrease in the amount of ambient light based on the light data:

a) ceasing said displaying the message on the second mobile device, b) transmitting an alert message from the second mobile device to the first mobile device, and c) displaying the alert message on the first mobile device for viewing by the first user.

2. The method of claim 1, wherein the displaying the alert message on the first mobile device includes displaying the alert message on a first display interface, of the first mobile device, configure to display such alert message, and said displaying the message on the second mobile device includes displaying the message on the second mobile device that comprises a second display interface configured to display the message.

3. The method of claim 2, wherein said displaying the message on the second mobile device includes displaying said message on the second mobile device in which the camera, the one or more light sensors, and said second display interface are located on the same side of the second mobile device.

4. The method of claim 1, wherein the monitoring the image data to detect the possible presence of the one or more suspected camera lenses within the field of view of the camera comprises the steps of:

converting the image data into a plurality of input images, wherein each of the input images depicts the field of view of the camera at a particular point in time;

generating a probability map for each of the input images, said probability map representing a probability that the one or more suspected camera lenses are present at particular spatial locations on each of the input images; and generating a user-perceivable output representing the possible presence of the one or more suspected camera lenses within the field of view of the camera based, at least in part, on the probability map.

5. The method of claim 4, comprising
determining said probability that the one or more suspected camera lenses are present at particular spatial locations on each of the input images, at least in part, by comparing the particular spatial locations on each of the input images with a plurality of conventional camera lens images.

6. The method of claim 5, wherein said comparing of the particular spatial locations on each of the input images with the plurality of conventional camera lens images uses, at least in part, convolutional neural networks.

7. The method of claim 1, wherein said transmitting the message comprises transmitting the message including an activation flag, the activation flag being processed by the second mobile device to determine whether to carry out the step of monitoring the image data to detect the possible presence of one or more suspected camera lenses within the field of view of the camera.

8. The method of claim 1, comprising the step of activating the one or more motion sensors located on the second mobile device to capture movement data representing movement of the second mobile device, wherein the step of ceasing said displaying the message on the second mobile device is also triggered upon an indication by the movement data that the movement of the second mobile device has occurred.

9. A system configured to send a message from a first user with a first mobile device to a second user with a second mobile device, the system comprising:
a first mobile device and a second mobile device having a camera, each of the first and second mobile devices including a corresponding programmable computer processor and an associated tangible non-transitory storage medium, the storage media of the first and second mobile devices containing program codes which, when loaded on a corresponding mobile device, implements the same mobile application to be instanced on the first mobile device and on the second mobile device,
wherein the first mobile application on the first mobile device is configured to send the message to the second mobile device; and
wherein the mobile application on the second mobile device is configured
to receive the message from the first mobile device,
to display the message on the second mobile device for viewing by the second user,
to activate the camera located on the second mobile device to capture image data regarding a field of view of the camera,
to activate one or more light sensors located on the second mobile device in close proximity to the second camera in order to capture data representing whether the camera is physically obstructed based on an amount of ambient light detected by the one or more light sensors,
to monitor the image data to detect a possible presence of one or more suspected camera lenses within the field of view of the camera, and
upon a first detection of the possible presence of the one or more suspected camera lenses within the field of view of the camera or upon a second detection by the one or more light sensors of a decrease in the amount of ambient light, a) to cease a display of the message on the second mobile device for viewing by the second user, b) to transmit an alert message from the second mobile device to the first mobile device, and c) to display the alert message on the first mobile device for viewing by the first user; and
a server in network communications with each of the first and second mobile devices, said server configured to facilitate sending and receiving of the message.

10. The system of claim 9, wherein the first mobile device comprises a first display interface configured to display the alert message on the first mobile device to be viewed by the first user and the second mobile device comprises a second display interface configured to display the message on the second mobile device for viewing by the second user.

11. The system of claim 10, wherein the camera, the one or more light sensors, and the second display interface are located on the same side of the second mobile device.

12. The system of claim 9, wherein the mobile application on the second mobile device is configured
to convert the image data into a plurality of input images, wherein each of the input images depicts the field of view of the camera at a particular point in time;
to generate a probability map for each of the input images, said probability map depicting a probability that the one or more suspected camera lenses are present at particular spatial locations on each of the input images; and
to generate a user-perceived output as to representing the possible presence of the one or more suspected camera lenses within the field of view of the camera based, at least in part, on the probability map.

13. The system of claim 12, wherein the system includes a lens-detection electronic circuitry configured to calculate a probability that the one or more suspected camera lenses are present at particular spatial locations on each of the input images by comparing said particular spatial locations on each of the input images with a plurality of conventional camera lens images.

14. The system of claim 13, comprising a tangible non-transitory storage medium with a database configured to store the plurality of conventional camera lens images.

15. The system of claim 13, configured to effectuate the comparison of the particular spatial locations on each of the input images with the plurality of conventional camera lens images by employing convolutional neural networks.

16. The system of claim 9, wherein the mobile application on the second mobile device is further configured to activate the one or more motion sensors located on the second mobile device to capture movement data representing a movement of the second mobile device, and wherein the ceasing the display of the message on the second mobile device is triggered upon a detection by the one or more motion sensors that the movement of the second mobile device has occurred.

* * * * *